(12) United States Patent
Settles et al.

(10) Patent No.: US 6,198,995 B1
(45) Date of Patent: Mar. 6, 2001

(54) SLEEP MODE FOR VEHICLE MONITORING SYSTEM

(75) Inventors: Steven Settles, Sterling Heights; Thomas Benzie, Ann Arbor, both of MI (US)

(73) Assignee: Lear Automotive Dearborn, Inc., Dearborn, MI (US)

( * ) Notice: Subject to any disclaimer, the term of this patent is extended or adjusted under 35 U.S.C. 154(b) by 0 days.

(21) Appl. No.: 09/052,782

(22) Filed: Mar. 31, 1998

(51) Int. Cl.[7] .......................... G01M 17/00; G06F 19/00; B60Q 1/00; H02H 7/18
(52) U.S. Cl. .............................. 701/29; 701/33; 701/36; 701/31; 340/438; 340/439; 340/517; 340/518; 340/693.3; 307/10.7; 307/141; 713/320; 713/501; 713/502
(58) Field of Search ................................... 701/29, 33, 36, 701/31, 32; 340/438, 439, 517, 518, 693.3; 307/9.1, 10.1, 10.7, 141, 141.4; 713/300, 320, 322, 323, 500, 501, 201; 710/36, 47, 44, 109, 220, 46, 19, 18, 6, 15

(56) References Cited

U.S. PATENT DOCUMENTS

| | | | |
|---|---|---|---|
| 4,698,748 | * | 10/1987 | Juzswik et al. ....................... 713/322 |
| 4,965,550 | * | 10/1990 | Wroblewski .......................... 340/524 |
| 5,566,351 | * | 10/1996 | Crittenden et al. .................. 395/867 |
| 5,617,572 | * | 4/1997 | Pearce et al. ........................ 395/750 |
| 5,621,250 | | 4/1997 | Kim ................................... 307/10.1 |
| 5,710,929 | * | 1/1998 | Fung ................................... 395/750 |
| 5,721,936 | * | 2/1998 | Kikinis et al. .................... 395/750.05 |
| 5,744,874 | * | 4/1998 | Yoshida et al. ..................... 307/10.1 |
| 5,758,189 | * | 5/1998 | Nakada et al. ....................... 395/866 |
| 5,799,198 | * | 8/1998 | Fung ............................... 395/150.05 |
| 5,892,959 | * | 4/1999 | Fung ............................... 395/750.05 |
| 5,939,998 | * | 8/1999 | Caporuscio et al. ............ 340/825.08 |
| 5,943,503 | * | 8/1999 | Kai ..................................... 395/839 |
| 5,949,812 | * | 9/1999 | Turney et al. ....................... 375/200 |
| 5,987,614 | * | 11/1999 | Mitchell et al. ..................... 713/300 |
| 6,065,122 | * | 5/2000 | Wunderlich et al. ................ 713/320 |
| 6,079,025 | * | 6/2000 | Fung ................................... 713/323 |

FOREIGN PATENT DOCUMENTS

| | | |
|---|---|---|
| 41 23 811 A1 | 1/1993 | (DE) . |
| 44 25 557 A1 | 1/1995 | (DE) . |
| 4455557 | 1/1995 | (DE) . |
| 0 435 738 | 7/1991 | (EP) . |
| 0435738 | 7/1991 | (EP) . |

* cited by examiner

*Primary Examiner*—William A. Cuchlinski, Jr.
*Assistant Examiner*—Brian J Broadhead
(74) *Attorney, Agent, or Firm*—Niro, Scavone, Hallero & Niro

(57) ABSTRACT

After a vehicle has entered a sleep mode, the disclosed method places the vehicle monitoring system into longer and longer nap periods provided the monitoring system does not receive a wake-up signal from one of a plurality of vehicle subsystems. During the nap periods, the monitoring system requires a reduced amount of operating power thereby decreasing the parasitic current drain on the battery during the sleep mode.

17 Claims, 2 Drawing Sheets

SLEEP MODE FOR VEHICLE MONITORING SYSTEM

BACKGROUND OF THE INVENTION

This invention relates to a method for operating a vehicle monitoring system during a sleep mode.

Many modern vehicles are designed to enter a sleep mode after the vehicle has been inactive for a predetermined length of time. In the sleep mode, most of the vehicle subsystems are switched to an off or inactive state to eliminate any parasitic or dark current draw on the battery from the inactive subsystems.

In a vehicle, a parasitic current draw continuously drains a small amount of current, usually a few milliamps, from a battery when the engine is off and the battery is not being continuously charged. Reducing the parasitic current draw on the battery increases the life of the battery as well as the length of idle time during which the battery will remain charged.

Modern vehicles are typically equipped with a monitoring system which monitors subsystem inputs and actuates other subsystems, as appropriate. As an example, the monitoring system will typically monitor motion detectors for the door locks and other systems.

Some vehicle subsystems, such as the vehicle monitoring system, must remain in a semi-active state in the sleep mode to detect unauthorized entry into the vehicle or prevent unauthorized ignition of the engine. Also, the monitoring system wakes the vehicle when an operator unlocks a door or activates a door handle switch. To operate in a semi-active state during the sleep mode requires power or current from the battery. As a result, prior art vehicle monitoring systems typically place a parasitic current draw on the battery during the sleep mode. It would be desirable to reduce the amount of parasitic or dark current draw on the battery of the vehicle during the sleep mode.

SUMMARY OF THE INVENTION

In a disclosed embodiment of this invention, a vehicle monitoring system having inputs from a plurality of vehicle subsystems is operated by a method which conserves power. The method includes the steps of placing the vehicle into a sleep mode wherein wake-up signals are not normally placed on the inputs by the plurality of vehicle subsystems, scanning the inputs through repetitive cycles for wake-up signals, timing the scanning through a predetermined time period, and increasing the time between cycles from scanning step to scanning step in response to a lack of wake-up signals on the inputs in each predetermined time period for each prior scanning step.

In a preferred embodiment, the method further includes the steps of decreasing the time between cycles from scanning step to scanning step in response to a wake-up signal on any one of the inputs, decreasing the amount of time between cycles based upon a priority level associated with the wake-up signal, and waking the vehicle when the wake-up signal is verified.

These and other features of the present invention will be best understood from the following specification and drawings, the following of which is a brief description.

DETAILED DESCRIPTION OF THE PREFERRED EMBODIMENT

Figure 1:
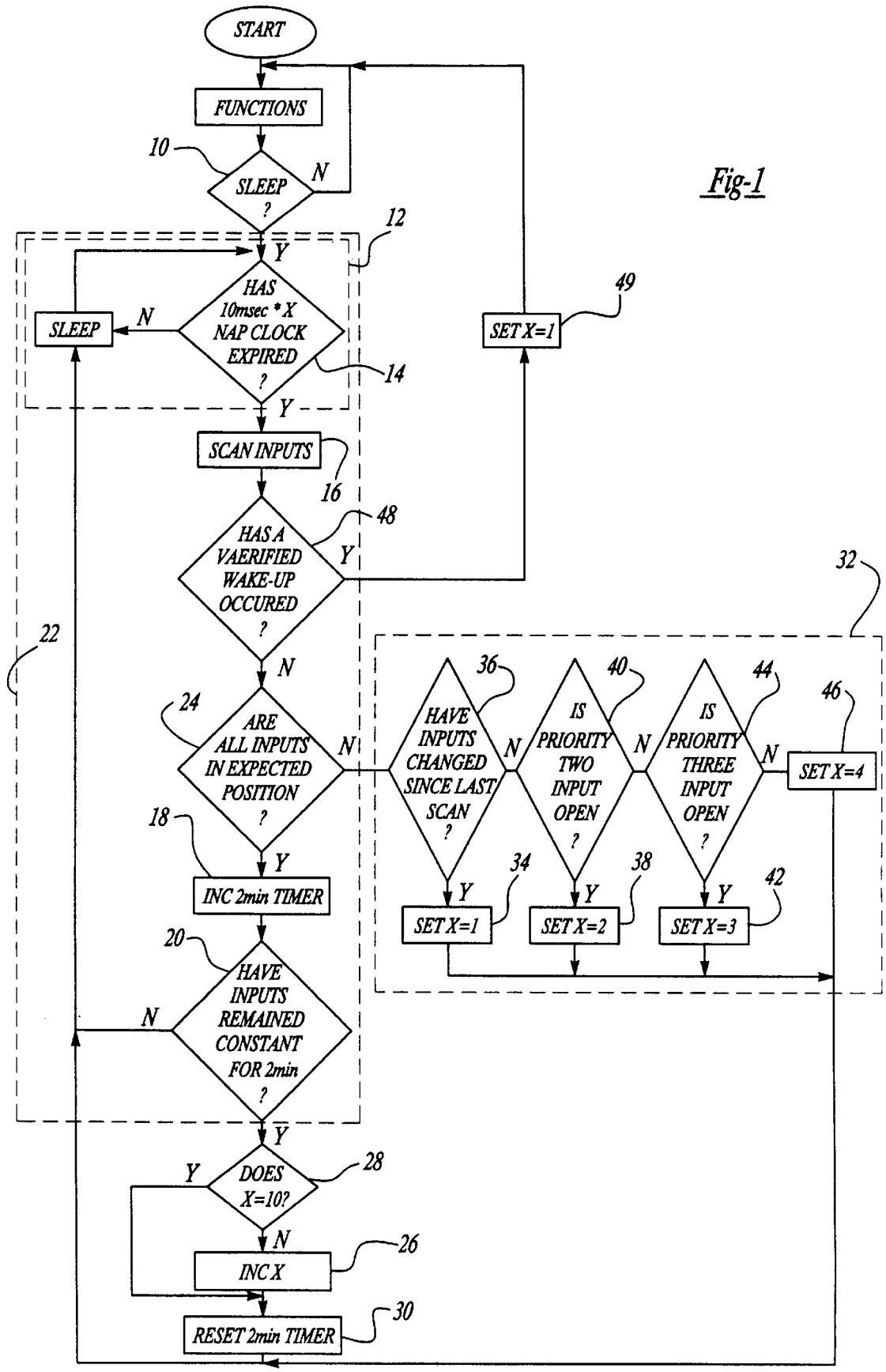
FIG. 1 is a flow chart illustrating a method for operating a vehicle monitoring system according to the present invention.

Referring to FIG. 1, a flow chart illustrating a method for operating a vehicle monitoring system according to the present invention is shown. As will be appreciated by one of ordinary skill in the art, although the flow chart illustrates sequential steps, the particular order of processing is not important to achieving the objects of the present invention. As will also be recognized, the method illustrated may be performed in software, hardware, or a combination of both as in a preferred embodiment of the present invention.

The vehicle monitoring system includes inputs from a plurality of vehicle subsystems. The vehicle subsystems which may be monitored include, but are not limited to, a security alarm system, a remote keyless entry system, door cylinder lock switches, door handle switches, and door ajar switches. The method of operation begins when the vehicle is placed into a sleep mode, as represented by block 10 in FIG. 1. That is, when the vehicle is turned off. In the sleep mode, wake-up signals are not normally placed on the inputs by the plurality of vehicle subsystems. The vehicle monitoring system enters and remains in a nap loop, as represented by block 12, until a nap clock has expired, as represented by block 14. In a preferred embodiment, the nap clock is set to T*X, where T equals a discrete amount of time (in one example, ten milliseconds) and X is used to vary the length of the nap loop. During the nap loop, the vehicle monitoring system requires a reduced amount of power or current. Accordingly, lengthening the nap loop further decreases the amount of parasitic current draw by the vehicle monitoring system on the battery.

After the nap clock has expired, the inputs to the vehicle monitoring system are scanned for wake-up signals, as represented by block 16. Repetitive nap-scan cycles are timed through a predetermined time period, as represented by blocks 18 and 20. In one embodiment, the predetermined time period is set by a two minute timer. Therefore, in this embodiment, the vehicle monitoring system performs repetitive nap-scan cycles for two minutes. Completion of repetitive nap-scan cycles for the predetermined time period constitutes one scanning step, as represented by block 22.

In response to a lack of wake-up signals on the inputs for one complete scanning step, as determined by block 24, the nap clock is increased by incrementing X prior to the next scanning step, as represented by block 26. Increasing the nap clock increases the time between each nap-scan cycle. In a preferred embodiment, the time between each nap-scan cycle is increased by the amount of time T in response to a lack of wake-up signals on all of the inputs for one complete scanning step. Alternatively, the lack of signals may only be necessary from certain of the inputs for the time to increase. As disclosed above, T is preferably much less than one second (ten milliseconds in one embodiment). Therefore, in response to a lack of wake-up signals on all of the inputs for one complete scanning step, the time between nap-scan cycles is increased by a discrete increment from scanning step to scanning step. The time between nap-scan cycles may be increased up to a maximum amount of time. In the disclosed embodiment, X is limited to a maximum of ten, as represented by block 28, and, therefore, the maximum amount of time is equal to T*X, where T is equal to a discrete time unit and X is equal to ten. As represented by block 30, the two minute timer is reset and new scanning step initiated.

One of ordinary skill in the art will recognize that the value of T, the maximum value of X, and the time period for the timer can all have different values without departing from the spirit and scope of the present invention. Moreover, an increase in a fashion other then incremented steps may be used.

Alternatively, in response to a wake-up signal on any one of the inputs, the time between cycles is decreased, as represented in general by block 32. The wake-up signal from each vehicle subsystem is preferably classified into one of a plurality of priority levels. The decrease in the amount of time between cycles is based upon the priority level of the wake-up signal. In general, the decrease in time between nap-scan cycles is accomplished by reducing X and, thereby, shortening the nap clock. The reduction of X is based upon the priority level of the wake-up signal.

In the disclosed embodiment, the amount of time between cycles is decreased to a first predetermined amount in response to a first priority level wake-up signal; the amount of time between cycles is decreased to a second predetermined amount in response to a second priority level wake-up signal; the amount of time between cycles is decreased to a third predetermined amount in response to a third priority level wake-up signal; and the amount of time between cycles is decreased to a fourth predetermined amount in response to all other wake-up signals with the first, second, third, and fourth predetermined amounts being different. In a preferred embodiment, X is set to equal one if the wake-up signal was not detected during the previous scan, as represented by blocks 34 and 36; X is set to equal two if the wake-up signal is classified as a second priority level and the wake-up signal was not detected during the previous scan, as represented by blocks 38 and 40; and X is set to equal three if the wake-up signal is classified as a third priority level and the wake-up signal was not detected during the previous scan, as represented by blocks 42 and 44. If the wake-up signal does not meet the above criteria, then X is set to equal four, as represented by block 46. After X is set to a reduced value, the vehicle monitoring system returns to the nap loop 12.

Upon the verification of a wake-up signal, X is set to equal one and the vehicle is awaken from the sleep mode, as represented by blocks 48 and 49. The verification process ensures that a false or erroneous wake-up signal was not detected. For example, electrical fields surrounding the vehicle may cause noise on an input to the vehicle monitoring system which may be falsely detected as a wakeup signal. By requiring that the wake-up signal be continuously detected for a minimum amount of time or through a minimum number of scans, a false or erroneous wake-up signal will not wake the vehicle from the sleep mode.

Figure 2:
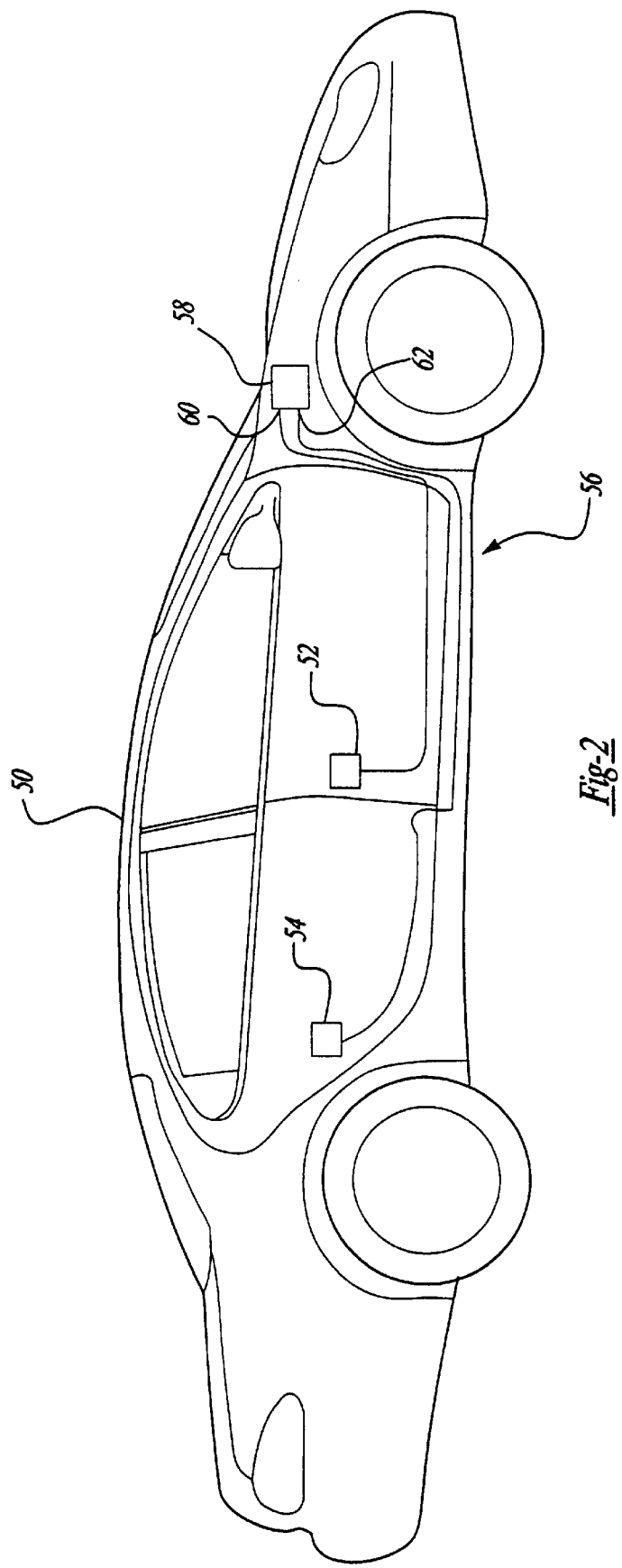
FIG. 2 is a fragmentary side view of the vehicle monitoring system according to the present invention installed in a vehicle.

FIG. 2 is a fragmentary side view of the vehicle monitoring system 56 according to the present invention installed in a vehicle 50. The vehicle 50 includes a plurality of inputs of vehicle subsystems 52 and 54. The vehicle monitoring system 56 consists of a controller 58 and an operating program, not shown. The controller 58 includes a plurality of inputs 60 and 62 electrically connected to the plurality of inputs of vehicle subsystems 52 and 54.

The operating program places the vehicle into a sleep mode and scans the inputs 52 and 54 through repetitive cycles for wake-up signals while timing the scanning through a predetermined time period, and increases the time between cycles from scanning step to scanning step in response to a lack of wake-up signals on all of the inputs 52 and 54 in each predetermined time period for each prior scanning step. The operating program includes software for increasing the time between cycles by T amount of time from scanning step to scanning step. The time between cycles may be increased to a maximum amount of time equal to ten*T.

The operating program further includes software for decreasing the time between cycles from scanning step to scanning step in response to a wake-up signal on any one of the inputs. The operating program classifies the wake-up signal from each vehicle subsystem into one of a plurality of priority levels. The operating program decreases the amount of time between cycles based upon the priority level of said wake-up signal. More specifically, the operating program includes software for decreasing the amount of time between cycles to a first predetermined amount, for example ten milliseconds, when any wake-up signal is detected for the first time; for decreasing the amount of time between cycles to a second predetermined amount, for example twenty milliseconds, in response to a second priority level wake-up signal, such as a door open or trunk open wake-up signal; decreasing the amount of time between cycles to a third predetermined amount, for example thirty milliseconds, in response to a third priority level wake-up signal, such as glove box open or radio removed wake-up signal; and decreasing the amount of time between cycles to a fourth predetermined amount, for example forty milliseconds, in response to all other wake-up signals. Upon verification of a wake-up signal, the operating program wakes the vehicle from the sleep mode.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A method of operating a vehicle monitoring system having inputs from a plurality of vehicle subsystems comprising the steps of:
   1) placing the vehicle into a sleep mode wherein wake-up signals are not normally placed on the inputs by the plurality of vehicle subsystems;
   2) scanning the inputs through repetitive cycles for wake-up signals;
   3) timing said scanning through a predetermined time period; and
   4) increasing the time between cycles from scanning step to scanning step in response to a lack of wake-up signals on at least certain of the inputs in each predetermined time period for each prior scanning step.

2. A method as set forth in claim 1 further defined as increasing the time between cycles by a discrete amount of time from scanning step to scanning step.

3. A method as set forth in claim 2 further defined as increasing the time between cycles up to a maximum amount of time.

4. A method as set forth in claim 1 wherein said increasing of step 4) only occurs when there is a lack of wake-up signals on all of the inputs.

5. A method as set forth in claim 1 including decreasing the time between cycles from scanning step to scanning step in response to a wake-up signal on at least certain of the inputs.

6. A method as set forth in claim 5 further defined as classifying the wake-up signal from each vehicle subsystem into one of a plurality of priority levels.

7. A method as set forth in claim 6 further defined as decreasing the amount of time between cycles based upon said priority level of said wake-up signal.

8. A method as set forth in claim 6 further defined as decreasing the amount of time between cycles to a first predetermined amount in response to a first priority level wake-up signal and decreasing the amount of time between cycles to a second predetermined amount in response to a second priority level wake-up signal with said first and second predetermined amounts being different.

9. A method as set forth in claim 5 including waking the vehicle when said wake-up signal has been verified.

10. A system for monitoring a vehicle having a plurality of vehicle subsystems each capable of transmitting a wake-up signal, the system comprising:

a controller receiving a plurality of inputs, with each input received from one of the plurality of vehicle subsystems;

an operating program for placing said controller into a sleep mode and scanning said inputs through repetitive cycles for wake-up signals while timing said scanning through a predetermined time period, and for increasing the time between cycles from scanning step to scanning step in response to a lack of wake-up signals on at least certain of said inputs in each predetermined time period for each prior scanning step.

11. A system as set forth in claim 10 wherein said operating program increases the time between cycles by a discrete amount of time from scanning step to scanning step.

12. A system as set forth in claim 11 wherein said operating program increases the time between cycles up to a maximum amount of time.

13. A system as set forth in claim 10 wherein said operating program decreases the time between cycles from scanning step to scanning step in response to a wake-up signal on at least certain of the inputs.

14. A system as set forth in claim 13 wherein said operating program classifies the wake-up signal from each vehicle subsystem into one of a plurality of priority levels.

15. A system as set forth in claim 14 wherein said operating program decreases the amount of time between cycles based upon said priority level of said wake-up signal.

16. A system as set forth in claim 15 wherein said operating program decreases the amount of time between cycles to a first predetermined amount in response to a first priority level wake-up signal and decreases the amount of time between cycles to a second predetermined amount in response to a second priority level wake-up signal with said first and second predetermined amounts being different.

17. A system as set forth in claim 13 wherein said operating program wakes the vehicle when said wake-up signal has been verified.

* * * * *